(12) United States Patent  
Chang (10) Patent No.: US 7,692,741 B2
(45) Date of Patent: Apr. 6, 2010

(54) BOTTOM SUBSTRATE FOR LIQUID CRYSTAL DISPLAY

(75) Inventor: Lu-Kuen Chang, Tao Yuan Shien (TW)

(73) Assignee: Quanta Display Inc., Tao Yuan Shien (TW)

( * ) Notice: Subject to any disclaimer, the term of this patent is extended or adjusted under 35 U.S.C. 154(b) by 192 days.

(21) Appl. No.: 11/360,376

(22) Filed: Feb. 24, 2006

(65) Prior Publication Data

US 2006/0197891 A1 Sep. 7, 2006

(30) Foreign Application Priority Data

Mar. 1, 2005 (TW) .............................. 94106138 A (51) Int. Cl.
*G02F 1/1335* (2006.01)
*G02F 1/1333* (2006.01)
*G02F 1/13* (2006.01)
(52) U.S. Cl. .................... 349/113; 349/158; 349/187
(58) Field of Classification Search ............. 349/113, 349/158, 187
See application file for complete search history.

(56) References Cited

U.S. PATENT DOCUMENTS

| 6,600,535 | B1 | 7/2003 | Tsuda et al. |
| 2003/0142247 | A1 | 7/2003 | Nishiyama et al. ............. 349/67 |
| 2004/0145692 | A1* | 7/2004 | Yamazaki et al. ........... 349/123 |
| 2006/0023156 | A1* | 2/2006 | Lin et al. .................... 349/158 |
| 2007/0069210 | A1* | 3/2007 | Yamazaki et al. ............. 257/59 |

FOREIGN PATENT DOCUMENTS

CN 1410802 A 4/2003

* cited by examiner

*Primary Examiner*—Frank G Font
*Assistant Examiner*—Jerry Blevins
(74) *Attorney, Agent, or Firm*—Bacon & Thomas, PLLC

(57) ABSTRACT

A liquid crystal display bottom substrate with bumps is disclosed, which comprises: one thin film transistor located on a surface of a substrate, a passivation layer covered over the surface of the thin film transistor and that of the substrate, and a reflective metal layer formed over the passivation layer. A plurality of bumps are formed on the surface of the passivation layer, wherein the bumps have asymmetric shapes in the cross sections, and the projection of the center of said bumps on the substrate is not overlapped with the projection of the peak of the same bumps.

17 Claims, 7 Drawing Sheets

(PRIOR ART)

BOTTOM SUBSTRATE FOR LIQUID CRYSTAL DISPLAY

BACKGROUND OF THE INVENTION

1. Field of the Invention

The present invention relates to a bottom substrate for liquid crystal display device and the method for manufacturing the same, more particularly, to a bottom substrate for reflective liquid crystal display device and method for manufacturing the reflective or transflective liquid crystal display device.

2. Description of Related Art

Currently, the demand for dealing with the brightness problem of liquid crystal display exists since various liquid crystal displays and their related products appear in the market. Half of the present liquid crystal displays on the market consume huge energy or power in backlight module. Therefore, in order to solve brightness and power consumption problem, some researchers suggest to use the ambient light of the environment around displays. The suggested design does not only extend the lifetime of battery but also reduce the weight of the LCD device. In addition, the demand for transflective liquid crystal display designed for portable products such as cellular phones or PDA has increased recently. However, the technical requirement of the transflective liquid crystal display becomes more complicated than that of the transparent liquid crystal display.

It is known that a transflective display device has combined advantages of transparent displays and reflective displays. Actually, this kind of apparatus is provided with partially reflective medium. The partially reflective medium is like back flapping media of mirror, which allows the light from backlight module to pass by. At the same time, the light from the front side of the display can be reflected back and pass through the liquid crystal display (LCD) panel to enhance the brightness of the back light module. The manufacturer in this field is still seeking for better methods for manufacturing transflective display, which can provide more reflective light. It is not only viewable under sunlight, but allowed enough light from backlight module passing through; therefore, the display can be able to use indoor or overcast daytime.

According to the conventional preparing method of reflective layer, steps of forming a metal layer, which is provided with reflective properties, on the completed pixel electrode of thin film transistor (TFT) array is very common. Moreover, steps of forming bumps on the metal layer or on the pixel electrode, then forming a metal layer of reflective property in order to increase refractive index are also popular in the manufacturing process.

Most of the methods of prior arts for forming protrusions on the bottom substrate for a LCD panel are achieved though exposures, developing and etching. For instance, a method for manufacturing a rugged surface by several exposure, development and etching steps is disclosed in U.S. Pat. No. 6,600,535, as shown in FIG. 1A to FIG. 1M. However, the declined angle of each protrusion on the rugged surface made by the method disclosed in U.S. Pat. No. 6,600,535 is difficult to control. Moreover, the distance between adjacent protrusions cannot be easily controlled either since the distance between adjacent protrusions are easily effected by the conditions of exposures. Furthermore, the adjustment of the conditions or the sequence of steps of the conventional process for manufacturing the protrusions is also difficult. Hence, only rugged surface with regular protrusions is frequently made in convenience. The irregular protrusions can't be prepared easily by the conventional methods with steps of exposure, development, and etching. Owing to this reason, the reflective effect is limited.

Therefore, it is desirable to provide an improved method or device to mitigate and/or obviate the aforementioned problems.

SUMMARY OF THE INVENTION

The object of the present invention is to manufacturing asymmetric bumps on a surface by inkjet printing. Furthermore, the height and angle of the made bumps on a surface can be controlled with the ink amount and the viscosity. The benefit of the method of the present invention for producing reflective layer is to facilitate the controlling of the size, the density and the height of the bumps and flexibility for preparing various kinds of reflective layers.

The present invention of a liquid crystal display bottom substrate with bumps comprises: a thin film transistor located on a surface of a substrate, a passivation layer covering over the surface of the thin film transistor and the substrate; and a reflective metal layer formed on the passivation layer; wherein a plurality of bumps are formed between the passivation layer and the reflective metal layer, the bumps are provided with asymmetric shapes in the cross section, and peaks of bumps are not located on a normal line which passes through the center of the bumps and is perpendicular to the surface of the substrate.

The method of the present invention for manufacturing a bottom substrate of a LCD panel comprises steps of: (a) providing a substrate and a nozzle filled with a fluid; (b) inkjet printing the fluid filled in the nozzle over the substrate; and (c) curing the fluid on the substrate to form a plurality of bumps over the substrate; wherein the bumps have asymmetric cross section, and the peak of the bumps are not located on a normal line which passes through the center of said bumps and is perpendicular to the surface of said substrate.

According to the present invention, the projections of the center and the peak of a bump on the reflective layer of the bottom substrate are not overlapped.

The passivation layer formed on the surface of the thin film transistor can be any passivation layer. Preferably, the passivation layer is a planarized layer or an alignment layer.

The bottom substrate with the bumps for a LCD panel of the present invention is preferably used as bottom substrates for transflective LCD panels. The distance of any two adjacent bumps of the bottom substrate of the present invention can be the same or different. In fact, the distance between any two adjacent bumps can be adjusted according to the prepared pattern of the distribution of bumps. Furthermore, there is no limitation for the material of bumps. Any photoresist material can be used as the material of the bumps of the present invention. Preferably, thermo-curing resin or ultraviolet curable resin is used as the material of the bumps.

The bumps on the bottom substrate of the present invention can be single-layered or multi-layered bumps with a pattern having different distance between any two adjacent bumps. Moreover, the bumps can be formed by repeatedly inkjet printing to form patterns of highly dense bumps with short distance between adjacent bumps, or bumps with easily controlled angles of the declined side face. In addition, the bumps are provided with asymmetric shapes in the cross section, and the projection of the center of the bump on the substrate is not overlapped with the projection of the peak of the same bump. That is, the bumps have asymmetric cross section, and the peaks of the bumps are not located on a normal line which passes through the center of said bumps and is perpendicular to a surface of said substrate.

The reflective metal layer on the substrate of the present invention makes the bottom substrate having reflective effects, which can be further applied in any reflective or transflective display devices. The material of the reflective metal layer of the substrate of the present invention can be any reflective metal. Preferably, the material used to form the reflective metal layer is gold, silver, copper, aluminum, nickel or alloys thereof.

In one preferable example of the present invention, the surface of pixel areas (both the reflective area and the transparent area) of the substrate is covered with a passivation layer and a reflective layer. In other preferable examples, the passivation layer is only formed over the reflective area. In other words, bumps can be formed on partial or entire passivation layer on the surface of a bottom substrate for LCD panels by the present invention.

Other objects, advantages, and novel features of the present invention will become more apparent from the following detailed description when taken in conjunction with the accompanying drawings.

DETAILED DESCRIPTION OF THE PREFERRED EMBODIMENT

Several examples are provided following for illustrating the method for forming regular or irregular surface of the bottom substrate of a liquid crystal display. The bottom substrate with regular or irregular surface contributes the reflective property for the reflective or transflective liquid crystal display.

Example 1

Figure 1:
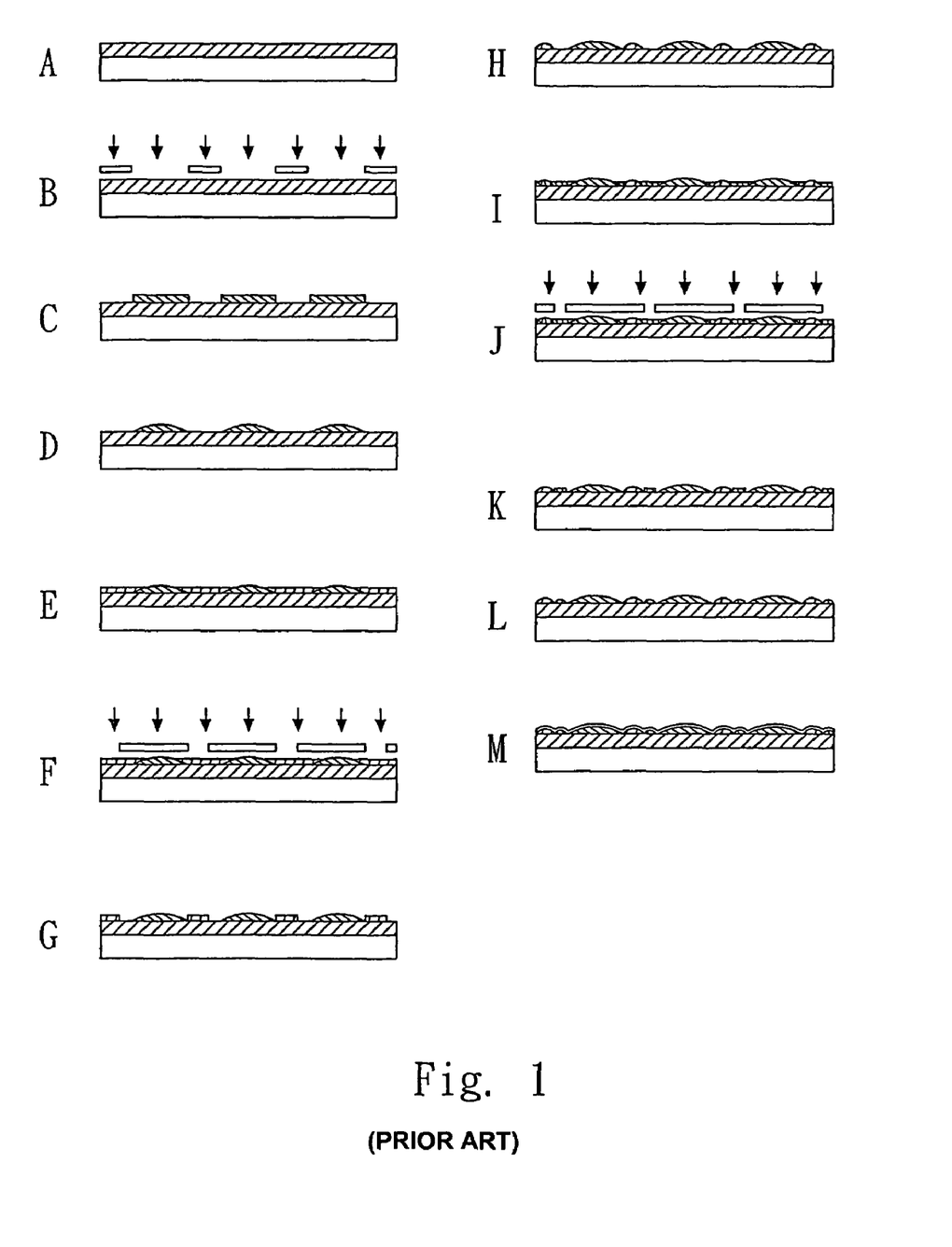
FIG. 1 is the sketch of prior art.
Figure 2:
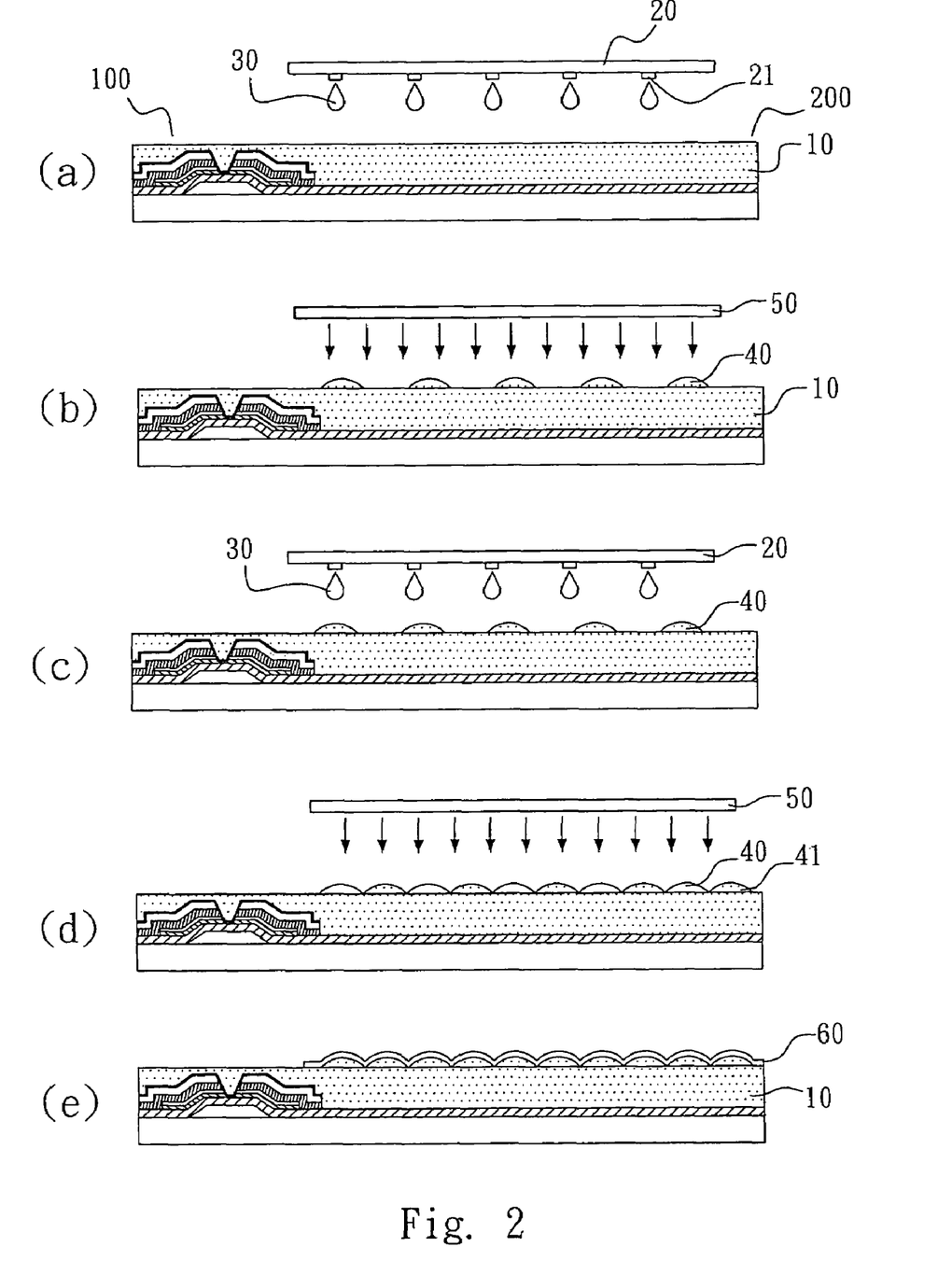
FIG. 2 is the preparing method of the present invention in example 1.

Referring to FIG. 2, a bottom substrate for a liquid crystal display is provided, wherein TFTs 100 have been manufactured thereon. Furthermore, the surface of the TFTs and the pixel area 200 is covered with a passivation layer 10. In the present embodiment, the passivation layer 10 is a planarized layer 10. An inkjet printing apparatus 20 filled a resin 30 is provided above the location of the target pixel area 200 where bumps will be formed. The resin 30 for forming bumps of the present example is a thermo-curing resin. By utilizing several nozzles 21 on the printing apparatus 20, resin drops 30 on the pixel area 200 can be inkjet printed on the planarized layer 10, as shown in FIG. 2(a). Then a heating apparatus 50 is used for hard baking the drops on the planarized layer 10 to solidify and shape the resin drops 30 for forming bumps 40, as shown in FIG. 2(b). After solidification, the bumps 40 obtained from resin drops 30 will be cured and have a shape with convex surface.

In order to increase density of bumps 40 on the planarized layer 10, the inkjet printing and hard baking are repeated (see FIG. 2(c), and FIG. 2(d)). The distance between the first formed bumps 40 and the second formed bumps 41 is narrower than that of any two adjacent first formed bumps 40, and thus further increase the refractive index of the bottom substrate.

Furthermore, since the refractive index of the resin of the bump 40 is poor, a reflective metal layer 60 is further formed on the surface of the bumps and that of the planarized layer 10 to provide high reflective property in the present example after the manufacturing process is completed.

In the inkjet printing process, the surface tension can be controlled by measures for adjusting the contact angle between the planarized layer and resin drops. For example, the surface activation in the pre-cleaning steps or other surface treatment before printing can be effective measures for adjusting the contact angles illustrated above. The method for manufacturing a reflective layer on the substrate by inkjet printing of the present example can prevent the sticking of the resin flowed from adjacent bumps before baking or curing. Of course, the distortion of the bump shape can be prevented.

Example 2

Figure 3:
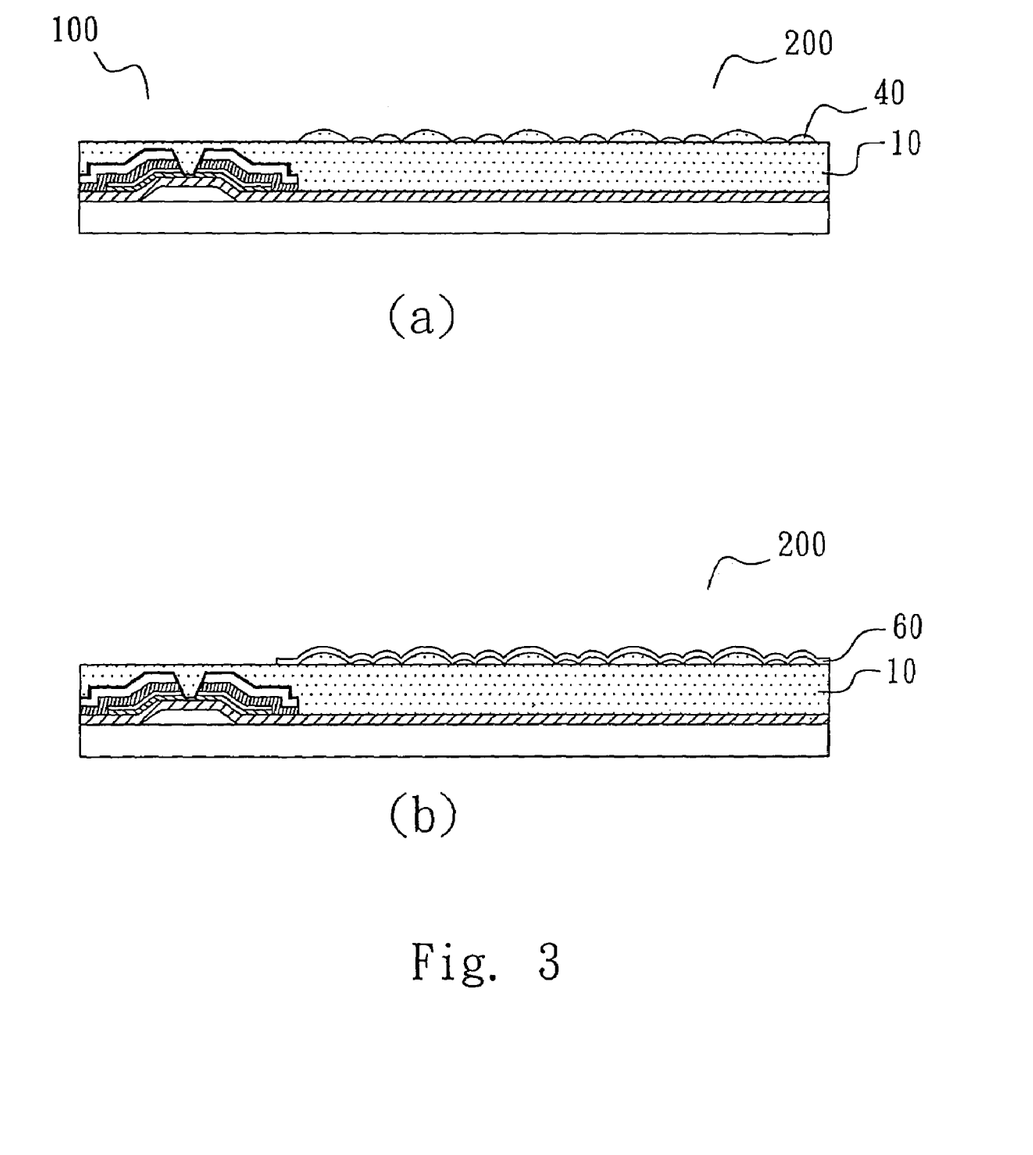
FIG. 3 is the preparing method of the present invention in example 2.

The art of the present invention can be used for preparing substrate with a regular or irregular rugged surface. Referring to FIG. 3, by controlling the resin volume spray out from the nozzle, the density, the arrangement, the size, and the shape of the bumps can be controlled. FIG. 3(a) shows substrate with bumps 40 of different size in pixel area 200 made by the same method illustrated in example 1. A metal layer 60 for providing reflective property is subsequently formed on the bumps 40 on the pixel area 200, as shown in FIG. 3(b), to obtain higher reflective index.

Example 3

By controlling the direction of the nozzle of the inkjet printing apparatus, the output dropping volume of the resin and the location control of printing, bumps of various shapes or declined angle can be made. In the present example, a cured bump is covered with another bump on the top with the same declined angle. This bump shape can improve the reflection in one specific direction to supply for various display apparatus.

Figure 4:
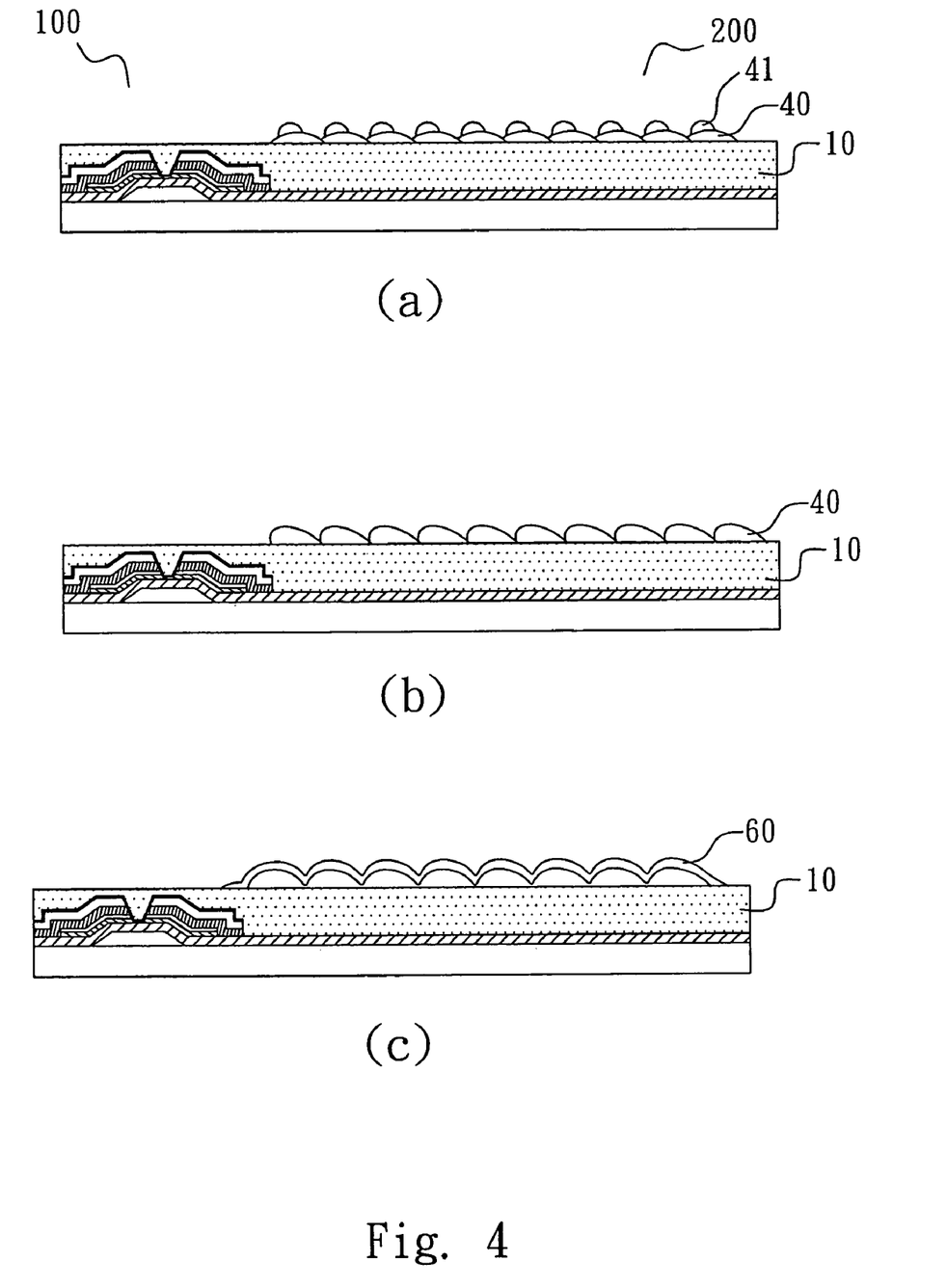
FIG. 4 is the preparing method of the present invention in example 3.

As shown in FIG. 4(a), the first bumps 40 are formed on a planarized layer 10 in a pixel area 200 of a bottom substrate of a LCD panel with TFTs 100 thereon. After baking, second bumps 41 are formed on the first bumps by adjusting the volume and location of the resin drops. In the present example, the second bumps 41 are formed on one predetermined side of the first bumps 40. After baking or exposing under ultraviolet, the first and second resin drops are formed in a shape as shown in FIG. 4(b), which are wave-shaped layer and then covered with a reflective metal layer 60, as in FIG. 4(c).

Example 4

Figure 5:
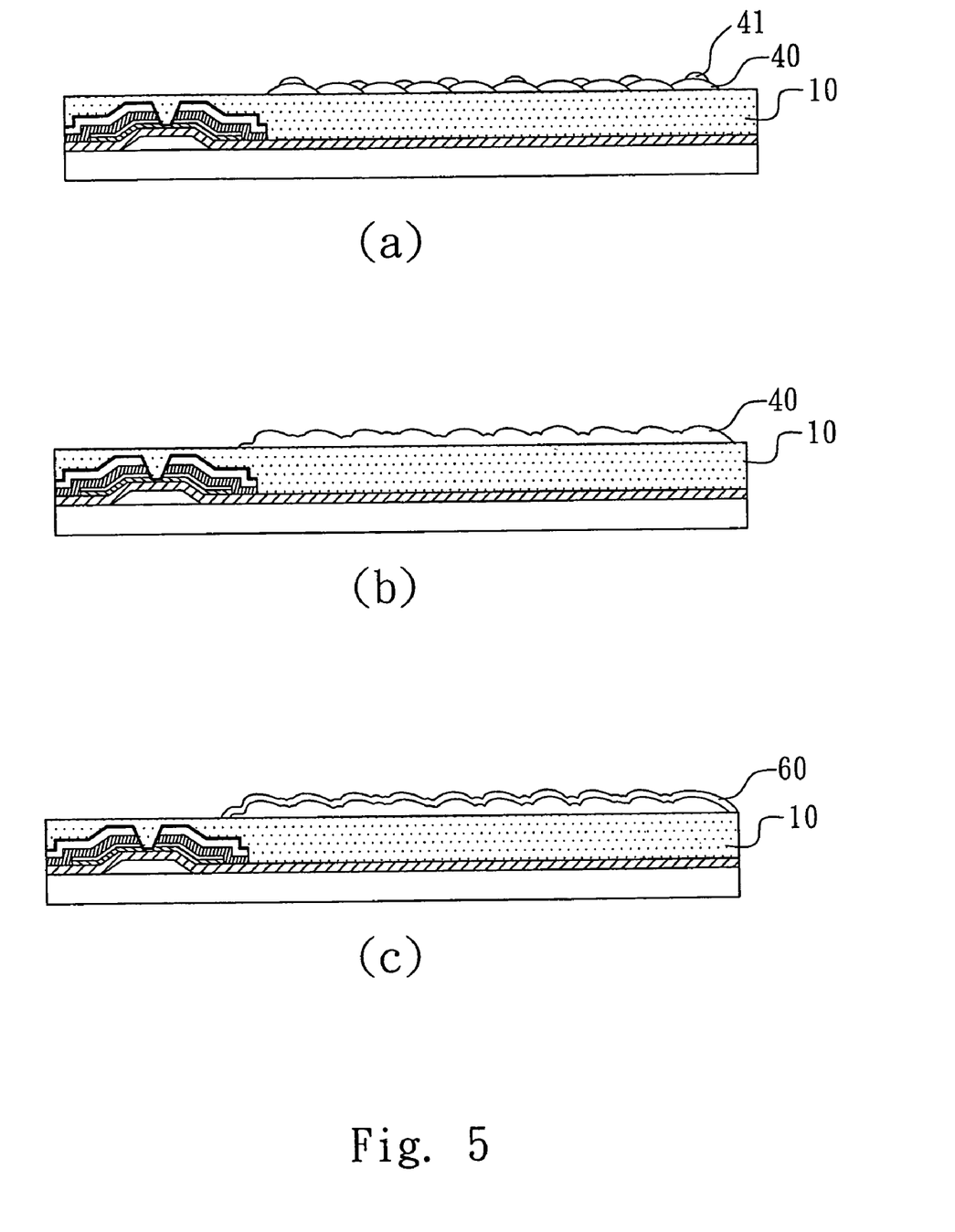
FIG. 5 is the preparing method of the present invention in example 4.

Compared to regular rugged surface, irregular surface is able to improve refractive index more. The method of the preset invention can be used for manufacturing bottom substrates with irregular rugged surfaces as shown in FIG. 5.

As shown in FIG. 5(a), first bumps 40 are formed on a planarized layer 10 in a pixel area. After baking, second bumps are formed on the first bumps by adjusting the volume and location of the resin drops. In the present example, the second bumps 41 are formed randomly on the first bumps 40. After baking or exposing under ultraviolet, the first and second resin drops are formed in a shape as shown in FIG. 5(b), which is an irregular and wave-shaped layer. Then a reflective metal layer 60 is formed on the baked bumps to form a reflective layer, as in FIG. 5(c).

Example 5

Figure 6:
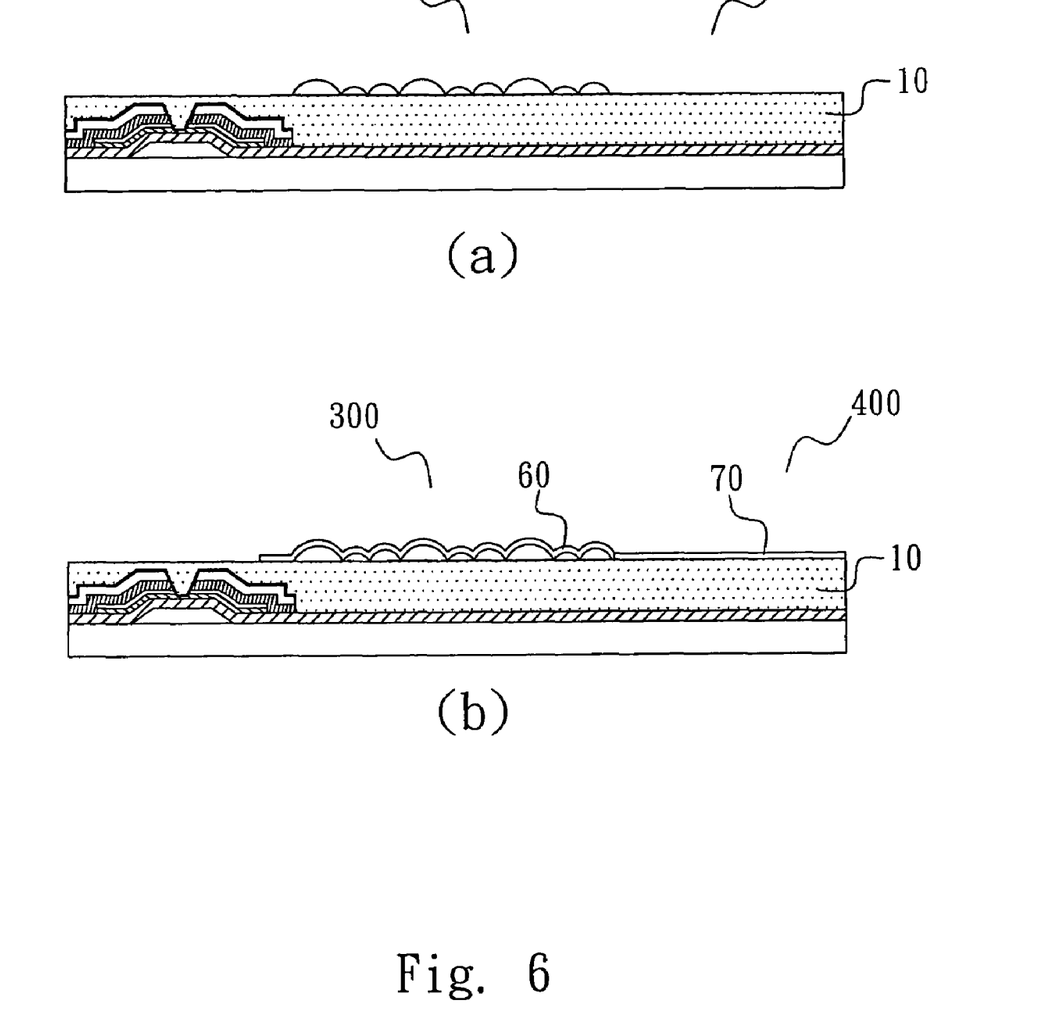
FIG. 6 is the preparing method of the present invention in example 5.

Referring to FIG. 6(a) and FIG. 6(b), the present invention is provided for preparing the reflective layer of transflective display device. The bottom substrate can be manufactured according to the method mentioned in example 1 to example 4, then a metal layer 60 is subsequently formed on the surface of the bumps once the bumps in reflective area 300 are prepared. However, the mentioned bumps are not formed in the transparent area 400 but a layer of highly transparent electrode 70, for example ITO or IZO.

Example 6

The bottom substrate for a liquid crystal display with the reflective layer provided in example 5 sometimes provides relatively poor brightness because the cell gap of one pixel causes the difference of transmitted light. Therefore, by removing the planarized layer 10 from the transparent area 400, a dual gap structure is formed which can improve the transparency and the transmission of light of the transflective liquid crystal display device.

Figure 7:
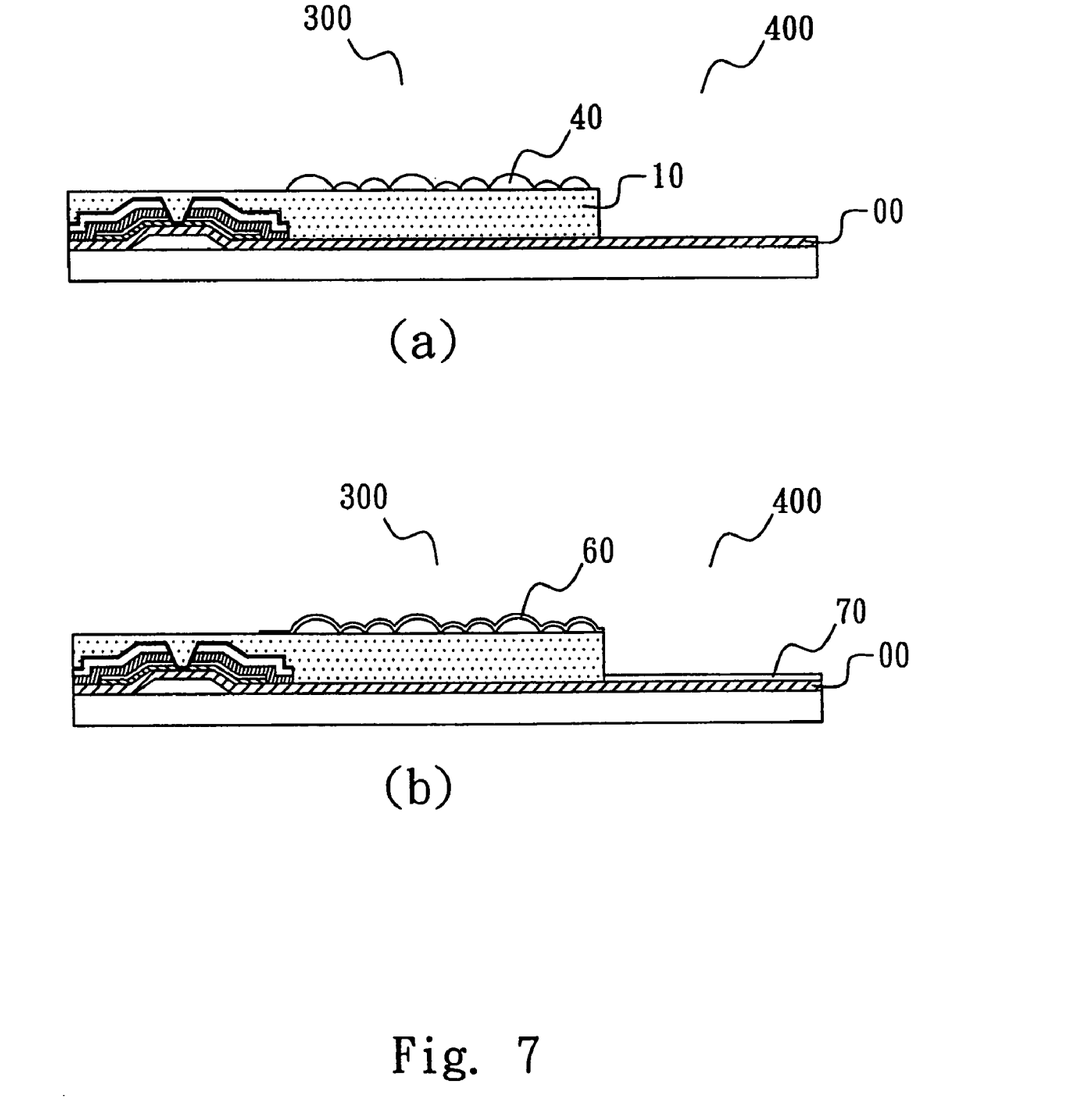
FIG. 7 is the preparing method of the present invention in example 6.

Referring to FIG. 7(a) and FIG. 7(b), after removing planarized layer 10 in transparent area 400, part of an insulating layer 00 is exposed. Bumps 40 are made on the surface of the planarized layer 10 in reflective area 300 and a reflective metal layer 60 is formed on the surface of the bumps 40. Regarding to the transparent area 400 without planarized layer 10, a layer of high transparent index transparent electrode 70 is deposited on the exposed insulating layer 00.

Although the present invention has been explained in relation to its preferred embodiment, it is to be understood that many other possible modifications and variations can be made without departing from the scope of the invention as hereinafter claimed.

What is claimed is:

1. A method for manufacturing a bottom substrate of a liquid crystal display, comprising steps of:
    (a) providing a substrate and at least one ink jet nozzle filled with a fluid;
    (b) forming a first bump by inkjet printing the fluid on the substrate; and
    (c) baking the first bump;
    (d) forming a second bump directly on the first bump by inkjet printing the fluid wherein the second bump is not located on a normal line of the first bump which passes through the center of the first bump; and
    (e) curing the first bump and the second bump to form an asymmetric bump on the substrate.

2. The method of claim 1, further comprising step (f) forming a reflective metal layer on the substrate and the asymmetric bump after step (e).

3. The method of claim 2, wherein a material of the reflective metal layer includes gold, silver, copper, aluminum, nickel or an alloy thereof.

4. The method of claim 1, wherein said substrate is a transflective substrate.

5. The method of claim 1, wherein the substrate in step (a) is a substrate having a plurality of thin film transistors.

6. The method of claim 1, wherein ink jet printing is with a plurality of ink jet nozzles and the distances between the adjacent nozzles in step (a) are the same.

7. The method of claim 1, wherein the fluid in step (b) is inkjet printed on a reflection area on the substrate.

8. The method of claim 1, wherein the fluid in step (a) includes a thermo-curable resin or an UV-curable resin.

9. The method of claim 1, wherein step (b) to step (d) are repeated after step (d) is achieved.

10. The method of claim 1, wherein the at least one nozzle includes a plurality of nozzles and the distances between the adjacent nozzles in step (a) are different.

11. The method of claim 1, wherein the bumps obtained from drops of the fluid have a shape with a concave surface and the distance between the first formed bumps and the second formed bumps is narrower than that of any two adjacent first formed bumps.

12. The method of claim 11, wherein the surface tension of drops is controlled by adjusting the contact angle between a planarized layer and the drops.

13. The method of claim 12, wherein density, arrangement, size or shape of bumps is controlled by controlling volume spray out from the ink jet nozzle and the substrate has a regular or irregular surface.

14. The method of claim 12, wherein bumps are formed on part of the planarized layer.

15. The method of claim 1, wherein the first and second bumps are formed of thermo-curing resin or ultraviolet curable resin.

16. A method for manufacturing a bottom substrate of a liquid crystal display, comprising steps of:
    (a) providing a substrate and at least one nozzle filled with a fluid;
    (b) forming a first bump by inkjet printing the fluid on the substrate;
    (c) forming a second bump directly on the first bump by inkjet printing the fluid wherein the second bump is not located on a normal line of the first bump which passes through the center of the first bump; and
    (d) curing the first bump and the second bump to form an asymmetric bump on the substrate.

17. The method of claim 16, wherein the first and second bumps are formed of thermo-curing resin or ultraviolet curing resin.

* * * * *